United States Patent
Huber et al.

(10) Patent No.: US 6,616,320 B2
(45) Date of Patent: Sep. 9, 2003

(54) COMBINED BLENDING AND PUMPING APPARATUS

(75) Inventors: Gordon R. Huber, Sabetha, KS (US); Gerald E. Schmelzle, Sabetha, KS (US); Timothy R. Hartter, Sabetha, KS (US); Adrian L. Strahm, Sabetha, KS (US); Michael J. Strahm, Sabetha, KS (US)

(73) Assignee: Wenger Manufacturing, Inc., Sabetha, KS (US)

(*) Notice: Subject to any disclaimer, the term of this patent is extended or adjusted under 35 U.S.C. 154(b) by 0 days.

(21) Appl. No.: 10/191,846

(22) Filed: Jul. 8, 2002

(65) Prior Publication Data

US 2002/0176319 A1 Nov. 28, 2002

Related U.S. Application Data

(60) Division of application No. 09/781,719, filed on Feb. 12, 2001, which is a continuation-in-part of application No. 09/740,448, filed on Dec. 19, 2000, now abandoned.

(51) Int. Cl.⁷ .............................. B01F 7/04; B01F 7/08; B01F 15/02
(52) U.S. Cl. ................... 366/156.2; 366/158.4; 366/186; 366/301
(58) Field of Search .................. 366/51, 81, 76.1, 366/76.3, 76.4, 76.6, 77, 80, 90, 91, 145, 147, 149, 152.1, 154.1–156.2, 158.1–158.4, 159.1, 160.3, 177.1, 186, 290, 291, 301, 318, 319, 322, 325.3; 241/82.1, 101.2, 101.6, 101.8; 198/676

(56) References Cited

U.S. PATENT DOCUMENTS 377,546 A * 2/1888 Crane
2,991,870 A * 7/1961 Griffith et al.
3,014,437 A * 12/1961 Dutchess
3,885,665 A * 5/1975 Fisher
3,920,223 A * 11/1975 Krueger
3,924,836 A * 12/1975 Bruning et al.
4,013,234 A * 3/1977 Fay
4,201,484 A * 5/1980 Sasiela et al.
4,314,451 A * 2/1982 Leeds et al.
4,473,299 A * 9/1984 Guibert
4,476,686 A * 10/1984 Madsen et al.
4,508,454 A * 4/1985 Anders (List continued on next page.)

FOREIGN PATENT DOCUMENTS

JP 4-206030 * 7/1992
WO 79/00345 * 6/1979

Primary Examiner—Charles E. Cooley
(74) Attorney, Agent, or Firm—Hovey Williams LLP

(57) ABSTRACT

A continuous mixer (32) is disclosed which can be used for mixing of incoming product streams (22, 24) of different characteristics respectively to yield a final product stream (26) of predetermined, consistent characteristics. The mixer (32) includes an elongated housing (42) having a pair of product input ports (50, 52) and an output (64), with a pair of elongated, axially rotatable, mixing screws (44, 46) located within the housing (42). The screws (44, 46) include a series of outwardly projecting mixing elements (114) preferably of pyramidal design and arrayed in a helical pattern along the length of the screws (44,46). The mixer (32) may be used in a processing system (20,200) having individual product lines (28, 30, 204, 206) coupled to the mixer (32), and is especially useful for processing of incoming meat streams (22,24) of different fat/lean ratios, to give a final comminuted output stream (26) of an intermediate and essentially constant fat/lean ratio. Preferably, the product lines (204,206) are each equipped with a combined preblender and pumping device (202).

1 Claim, 8 Drawing Sheets

U.S. PATENT DOCUMENTS

| | | | | |
|---|---|---|---|---|
| 4,606,647 A | * | 8/1986 | Frye |
| 4,674,887 A | * | 6/1987 | Lucke et al. |
| 4,708,268 A | * | 11/1987 | Wurtz |
| 4,733,607 A | * | 3/1988 | Star et al. |
| RE34,172 E | * | 2/1993 | Gwinn et al. |
| 5,318,358 A | * | 6/1994 | Wobbe et al. |
| 5,324,108 A | * | 6/1994 | Baumgarten |
| 5,358,693 A | * | 10/1994 | Brinkmann et al. |
| 5,433,968 A | * | 7/1995 | Zarraga et al. |
| 5,494,351 A | * | 2/1996 | Hakasalo |
| 5,707,145 A | * | 1/1998 | Lucke et al. |
| 5,800,055 A | * | 9/1998 | Sato |
| 5,913,602 A | * | 6/1999 | Steele |
| 5,981,269 A | * | 11/1999 | Park |
| 6,099,159 A | * | 8/2000 | Yoshida et al. |
| 6,322,244 B1 | * | 11/2001 | Marchesini et al. |
| 2002/0075754 A1 | * | 6/2002 | Huber et al. |
| 2002/0075755 A1 | * | 6/2002 | Huber et al. |

\* cited by examiner

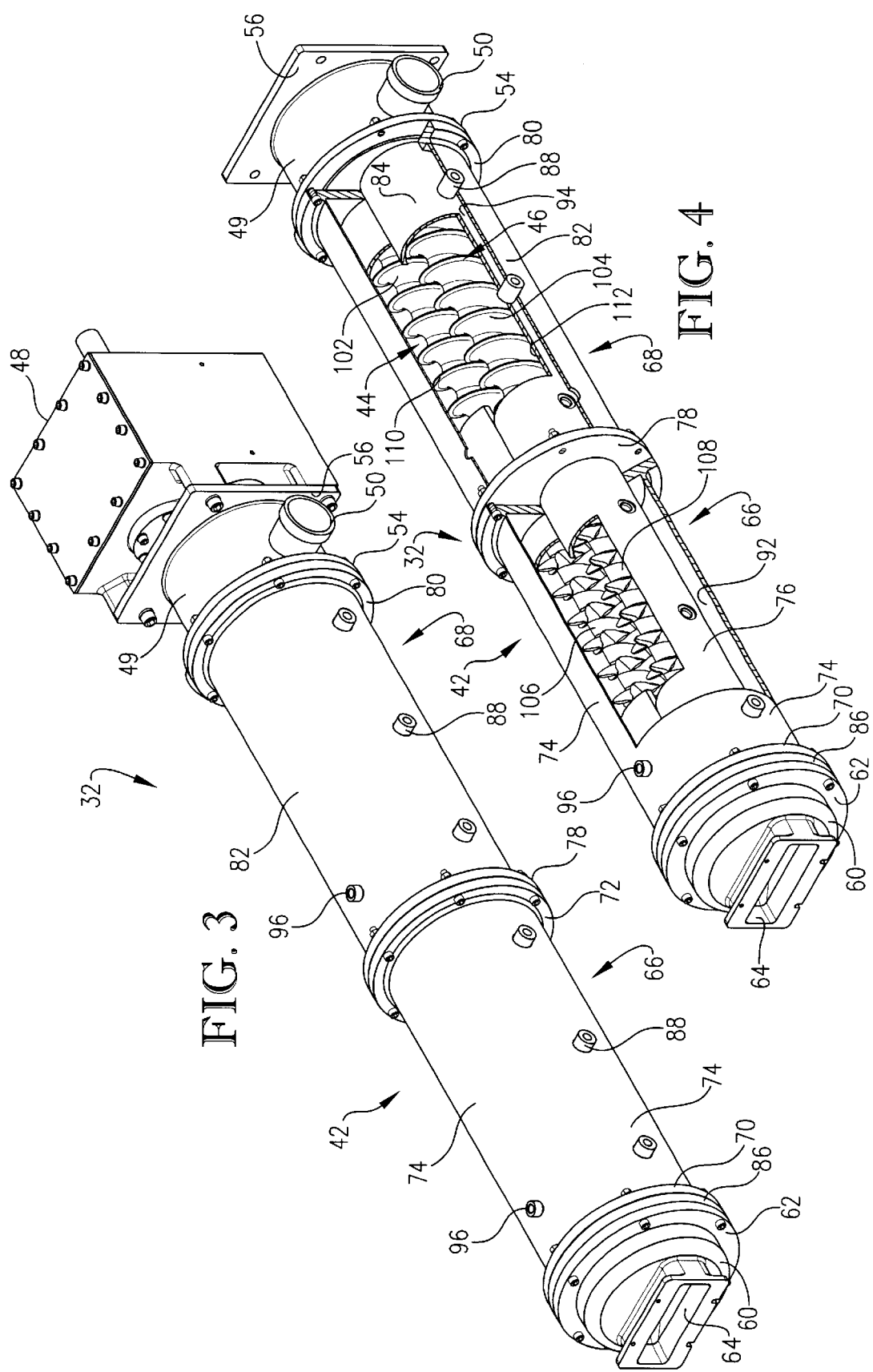

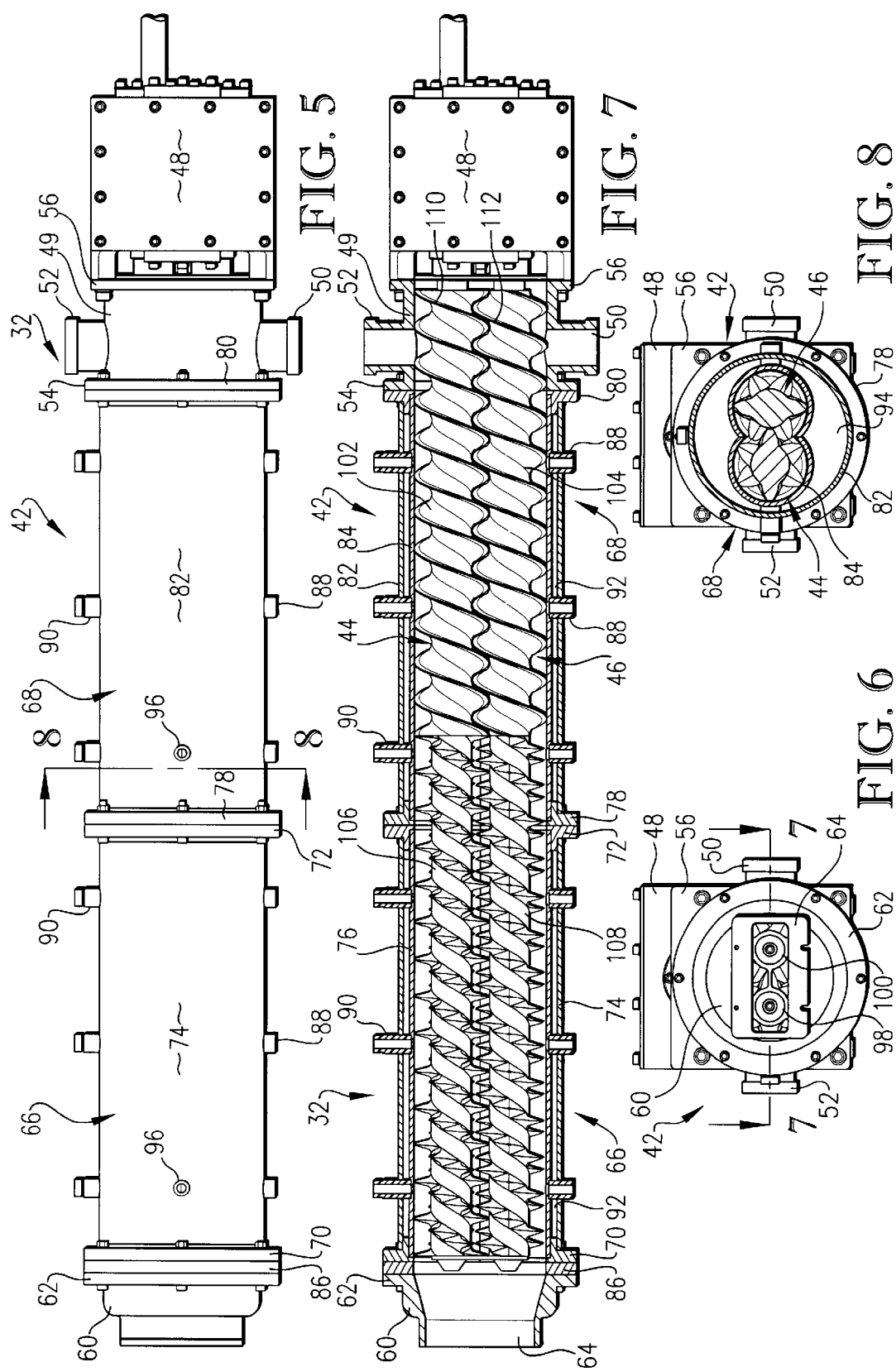

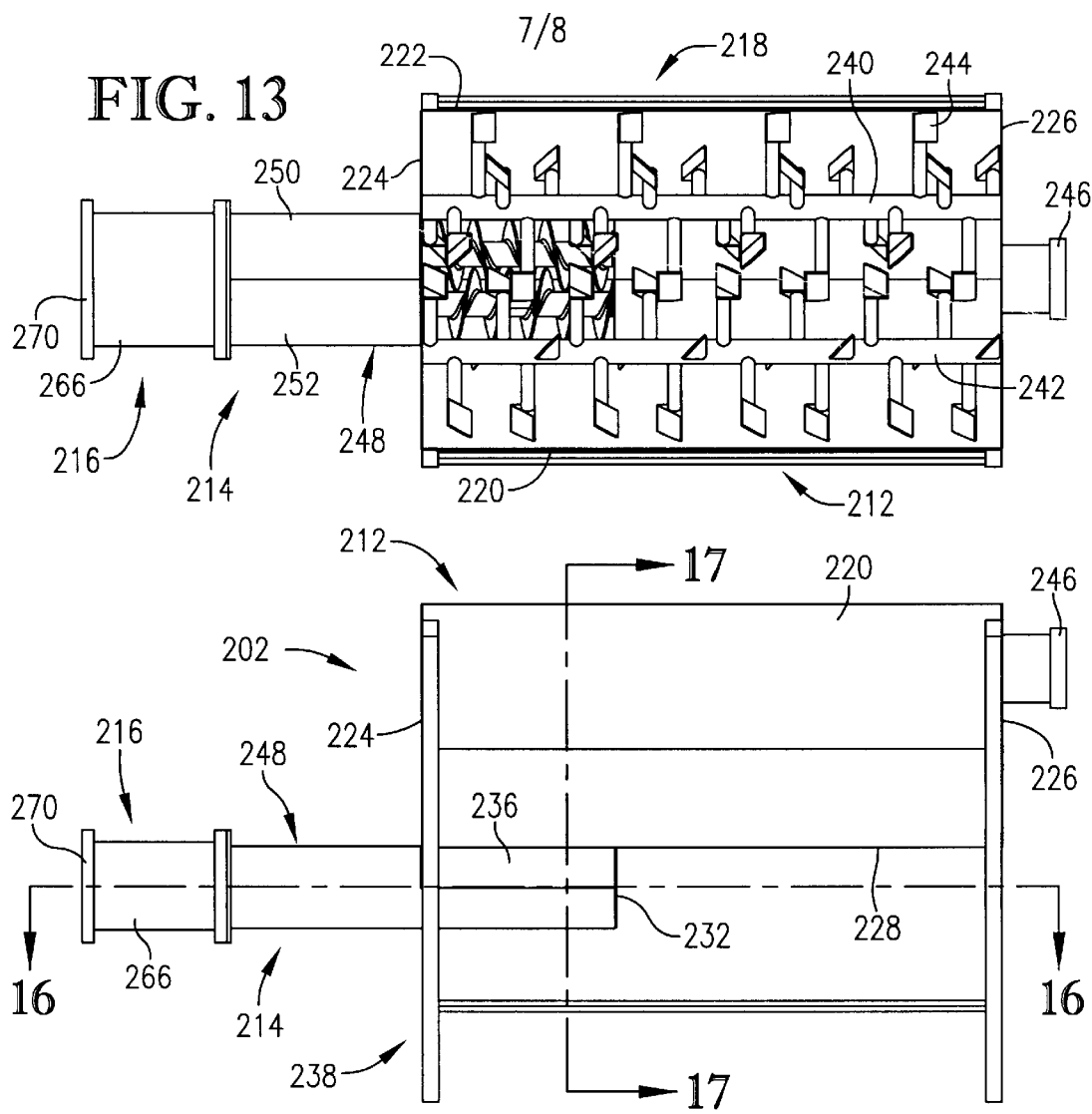
FIG. 13
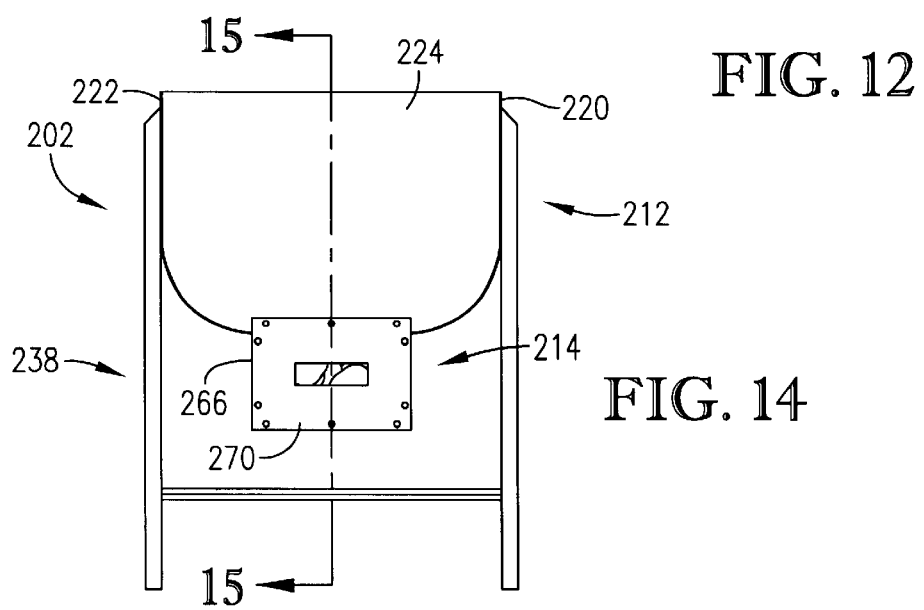
FIG. 12
FIG. 14

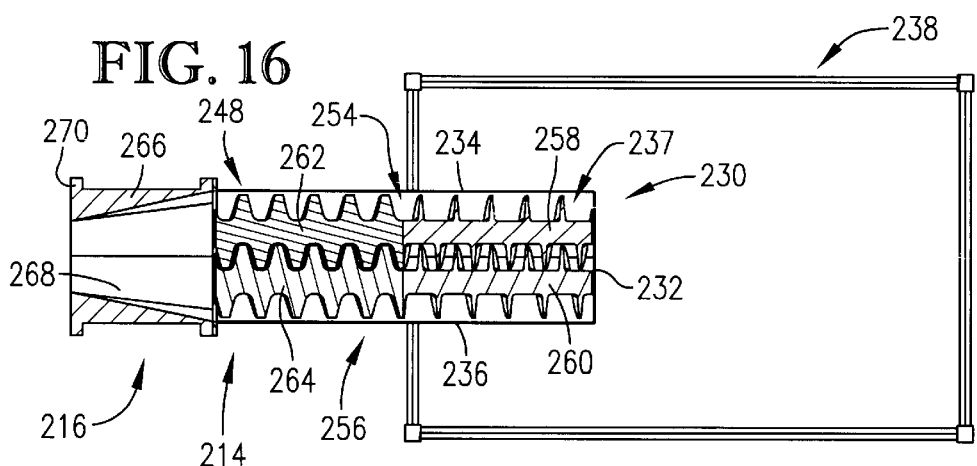
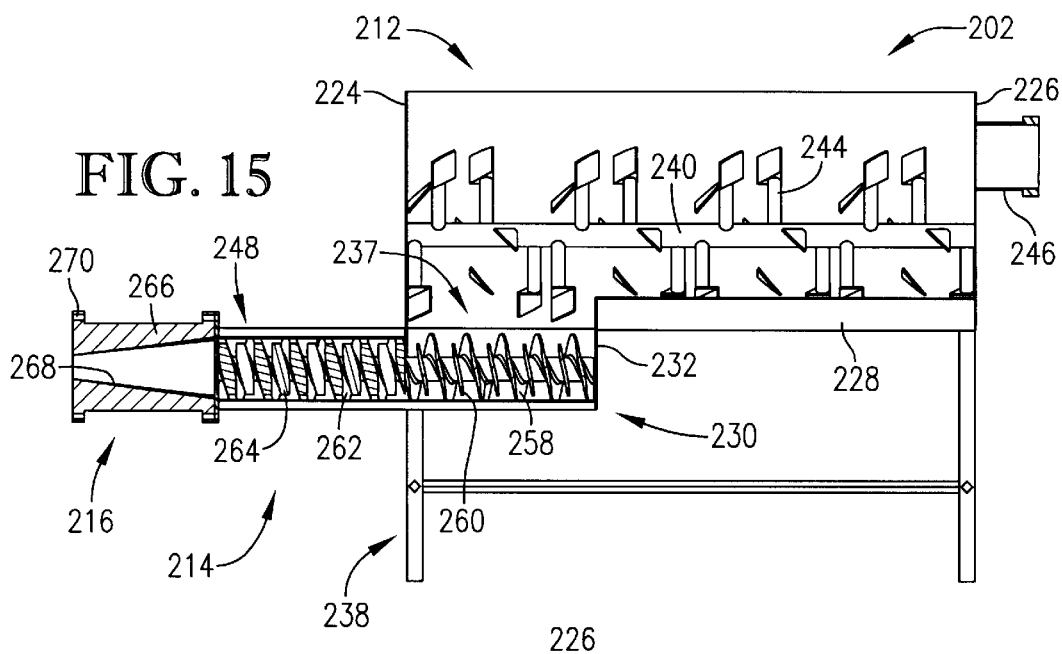

COMBINED BLENDING AND PUMPING APPARATUS

RELATED APPLICATION

This is a division of Ser. No. 09/781,719, filed Feb. 12, 2001, which is a continuation-in-part of application Ser. No. 09/740,448 filed Dec. 19, 2000, now abandoned.

BACKGROUND OF THE INVENTION

1. Field of the Invention

The present invention is broadly concerned with continuous mixing apparatus for the gentle yet thorough mixing of incoming product streams to yield a final product stream of predetermined desired characteristics. More particularly, the invention is concerned with such mixers, rotatable screws used therein, and methods of operation thereof, permitting the mixers to be used in overall systems preferably designed for the mixing of dissimilar characteristic incoming meat streams to produce a final product output stream of substantially constant characteristics. In addition, the mixer may also be used in the processing of substantially homogeneous products, such as in the mixing and stretching of cheese curd and the blending of fruits.

2. Description of the Prior Art

The meat industry is increasingly concerned with "case ready" meats which are prepared and packaged at a central processing facility, ready for display and sale at supermarkets. This marketing approach minimizes costly on-site labor at the supermarkets, leading to lower consumer prices. For example, comminuted meat products (e.g., hamburger) can be produced at a central facility and packaged in convenient sized consumer packages. One difficulty in this approach, however, lies in providing a consistent comminuted product having, e.g., the same fat/lean ratio. This is particularly difficult owing to the fact that starting meat sources may have very different fat/lean ratios, on a day-to-day or even hour-to-hour basis. Hence, a plant may be provided with meats having two widely divergent meat sources in terms of fat/lean ratios or other characteristics, and must be capable of accommodating such staring materials while still producing a comminuted product of substantially constant final properties.

Meat comminuting and mixing devices are in general well known, ranging from simple household sausage grinders to large industrial equipment. However, such prior devices cannot properly handle diverse starting products while still yielding consistent final products. In addition, it is important in the mixing and handling of meat products that the meat not be comminuted and mixed to the point that it exhibits "smearing" or the loss of particulate appearance.

There is accordingly a need in the art for improved mixing apparatus and systems which can accept starting products of divergent and changing characteristics while nevertheless producing final products having predetermined, consistent properties; in the context of meat processing, such mixing apparatus must also accomplish these ends without significantly altering the desired meat appearance.

SUMMARY OF THE INVENTION

The present invention overcomes the problems outlined above, and provides a continuous mixer for mixing incoming product streams to yield a final product stream of desired characteristics. Broadly speaking, the mixer includes an elongated housing having a plurality of inputs for receiving incoming product streams, as well as an output for the final product. A plurality (usually two) of elongated, side-by-side, axially rotatable mixing screws are located within the housing and extend along the length thereof in order to convey and mix the incoming streams and to move the final product out the housing output. Each of these mixing screws includes a series of outwardly projecting mixing elements each having a base and a plurality of converging sidewall surfaces, the latter cooperatively defining an outer end having a surface area less than the base surface area. These mixing elements are oriented along the length of the mixing screws, preferably in a helical pattern.

In preferred forms, the mixing screws are in intermeshing relationship and are designed to co-rotate, i.e., to rotate in the same direction; however, the screws can also be counter-rotating if desired. The screws preferably include input sections adjacent the housing product stream inputs and present helical flighting along the lengths thereof; the screws also have output sections extending from the ends of the input sections toward the housing output, with the outwardly projecting mixing elements being located on the output sections. The individual mixing elements are generally pyramidal in shape, presenting a base of generally diamond-shaped plan configuration with four outwardly extending, arcuate converging wall surfaces terminating in an apex-like outer end.

The housing is equipped with a plurality of injection ports spaced along the length thereof to permit injection of materials such as $CO_2$ into the housing during operation. In addition, the housing also a series of sensor ports along the length thereof to permit installation of temperature, pressure or other parameter sensors. In order to provide better temperature control, the housing has an outer shell and inner screw-receiving walls to define therebetween a passageway; cold water or other cooling media may be circulated through the passageway during operation of the mixer.

A particular (although not exclusive) utility of the mixer of the invention is for producing a comminuted meat product having a predetermined and substantially constant fat/lean ratio, using input meat streams of different fat/lean ratios respectively. To this end, the mixer is preferably used in an overall mixing system including a plurality of incoming product lines operably coupled with the mixer, where each of the product lines has a product source, a product pump and a product analyzer. In such a system, the pumps are operated to generate the incoming product streams, which are analyzed to determine a desired input characteristic thereof (such as fat/lean ratio). The operational speed of the individual product line pumps is then adjusted in response to analysis of the incoming product streams, thereby generating product streams having a desired input characteristic at a substantially constant magnitude for each incoming product stream. Once such constant characteristic streams are achieved the incoming product streams are directed to the mixer which is operated to create the final product stream. Preferably, this final product stream was again analyzed to determine a desired output characteristic thereof, followed by altering the operational speed of one or more of the product line pumps as necessary to maintain the desired output characteristic in the final product stream.

In another embodiment, each of the incoming product lines includes a combined preblender and pumping device in lieu of separate preblenders and pumps. Such a combined device preferably includes an upper hopper equipped with a pair of rotatable shafts having outwardly extending paddle elements. The hopper presents a bottom wall having front and rear portions, opposed front and rear wall sections and opposed sidewall sections coupled to the bottom wall. There is an opening through the bottom wall adjacent the front portion thereof. The hopper defines a mixing zone along the length of the bottom wall rear portion which is separate from the pumping device housing for initial mixing of an incoming product stream in the mixing zone with subsequent delivery of the mixed incoming product stream to the housing through the bottom wall opening and housing input. Also the device includes lower pumping section made up of side-by-side, fully intermeshed, rotatable auger screws which create the necessary pumping force to convey product from the combined device for downstream processing.

The preferred mixer is designed so as to mix incoming product streams and create a homogeneous output of substantially constant characteristics, without undue meat comminution or smear. In practice, the mixers of the invention are operated so as to limit meat temperature to no greater than about 50° F., more preferably from about 20–40° F. Residence time in the mixers of the invention should range up to about 3 minutes, more preferably from about 1–2 minutes; pressure conditions within the mixer are essentially atmospheric, but the mixer may be operated at a slight positive pressure if desired.

While the system and continuous mixer of the invention are especially adapted for use in the meat industry, a number of variations are possible. For example, spices or liquid smoke may be injected into the continuous mixer to produce sausage-like products. Alternately, textured vegetable protein may be added to one or more of the meat streams, or the system can be used to mix a meat stream and a TVP stream, respectively. Finally, the mixer of the invention, owing to its unique screw configuration, may be used for the processing of non-meat products such as cheeses, fruits and vegetables.

BRIEF DESCRIPTION OF THE DRAWINGS

FIG. 3 is an isometric view of the preferred continuous mixer forming a part of the system of FIG. 1;

FIG. 4 is an isometric view similar to that of FIG. 3, but with certain parts broken away to reveal the internal construction of the mixer;

FIG. 5 is a plan view of the mixer depicted in FIG. 3;

FIG. 6 is an end view of the mixer shown in FIG. 5, illustrating the output end of the mixer;

FIG. 7 is a sectional view taken along line 7—7 of FIG. 6;

FIG. 8 is a sectional view taken along line 8—8 of FIG. 5;

FIG. 12 is an elevational view of the apparatus depicted in FIG. 11;

FIG. 13 is a plan view of the FIG. 11 apparatus;

FIG. 14 is a front end view of the FIG. 11 apparatus;

FIG. 15 is a vertical sectional view taken along line 15—15 of FIG. 14 and illustrating the internal construction of the combined apparatus;

FIG. 16 is a horizontal sectional view taken along line 16—16 of FIG. 12;

FIG. 17 is a vertical sectional view taken along line 17—17 of FIG. 12; and

DESCRIPTION OF THE PREFERRED EMBODIMENTS

Figure 1:
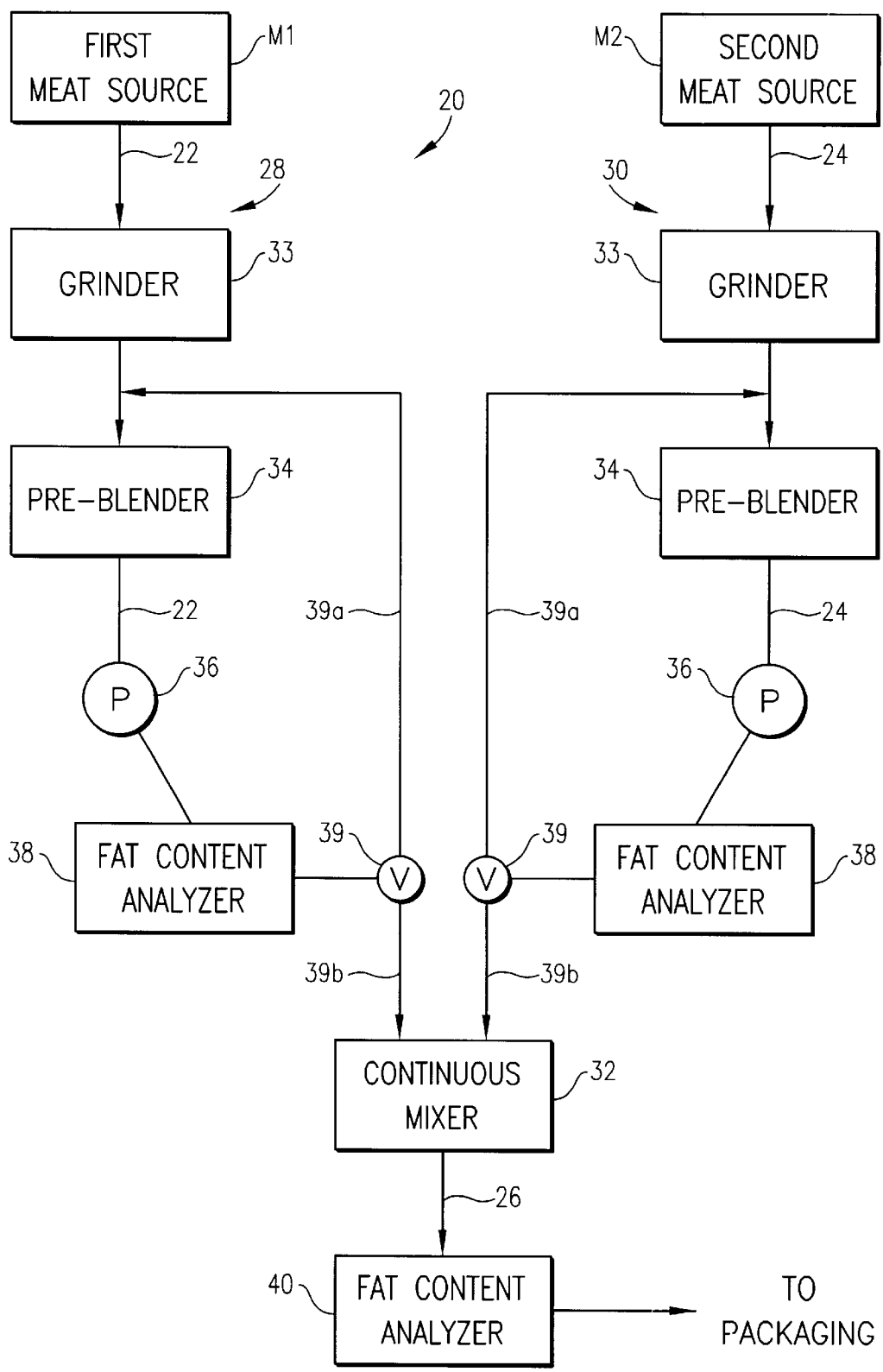
FIG. 1 is a schematic flow diagram illustrating the preferred system of the invention for homogeneously mixing a plurality of incoming product streams to yield a final product stream of desired characteristics.

Turning now to the drawings, and particularly FIG. 1, a preferred system 20 is schematically illustrated for homogeneously mixing plural incoming product streams 22 and 24 to yield a desired final product stream 26. Broadly speaking, the system 20 includes a pair of incoming product lines 28, 30 which are operatively coupled with a continuous mixer 32. The system 20 as shown is designed for processing first and second meat sources M1 and M2 having different fat/lean ratios in order to generate the final product stream 26 having a desired and predetermined fat/lean ratio.

In more detail, each of the product lines 28, 30 includes a grinder 33 and a preblender 34, a product pump 36, and a fat content analyzer 38. The grinder/preblend equipment 33, 34 is essentially conventional and is designed to take an incoming meat source and generate a uniform ground meat output. Similarly, the pump 36 and analyzer 38 are conventional.

As also illustrated in FIG. 1, a fat content analyzer 40 is used to determine the fat content of the final product stream 26; to this end, the analyzer 40 is downstream of mixer 32 and upstream of packaging equipment (not shown) used to package the final product. The output from analyzer 38 includes a three-way valve 39 with a recycle line 39a and a mixer conduit 39b.

Attention is next directed to FIGS. 3–10 which illustrate in detail the preferred mixer 32. Broadly, the mixer 32 includes an elongated housing 42 with a pair of elongated, side-by-side, axially rotatable, intermeshed mixing screws 44, 46 located within the housing and extending along the length thereof; the screws 44, 46 are rotated by means of a conventional gear reduction drive 48 coupled to a motor (not shown).

The housing 42 includes an inlet head 49 having a pair of opposed, tubular inlet ports 50, 52 and end walls 54, 56, as well as an outlet head of 60 presenting an end wall 62 and an elongated slot-like mixer output 64. As shown, the housing 42 also has two aligned head sections 66 and 68 between the inlet and outlet heads 49 and 60. The section 66 has a pair of circular end walls 70, 72; an outermost, elongated circular in cross-section shell wall 74 as well as an elongated, inner, screw-receiving wall 76 of somewhat "figure 8" configuration extend between and are supported by the walls 70, 72. Similarly, the section 68 has end walls 78, 80 supporting shell wall 82 and inner screw-receiving "figure 8" wall 84. As illustrated in FIG. 3 for example, the circular walls 72 and 78 are bolted together, with end wall 80 connected to reducer 48 and with end wall 70 coupled with wall 62 through an intermediate annular spacer 86; in this way, a housing 42 is provided with continuous inner screw-receiving walls.

The housing head sections 66 and 68 are each equipped with a series of injection ports 88 along the length thereof which permit attachment of injectors (not shown) for the selective injection of additives and/or coolants such as carbon dioxide. As best illustrated in FIG. 7, the ports 88 extend through the outer and inner housing walls to communicate with the interior of the housing. Also, the sections 66 and 68 have sensor mounts 90 along the length thereof for selective mounting and attachment of temperature or other type of sensors. In the use of mixer 32 as more fully described below, a liquid coolant may be passed through respective coolant passageways 92 and 94 provided between the outer and inner housing walls 74, 76 and 82, 84; to this end, the head sections 66 and 68 have appropriately sized and configured coolant entry ports 96 and corresponding outlet ports (not shown).

The screws 44, 46 are housed within and extend along the length of the housing 42. As shown in FIG. 8, the screws are positioned within the "figure 8" housing walls 76 and 84, and are operatively coupled to the drive 48 for rotation thereof. The screws include a respective elongated splined shafts 98, 100, which support corresponding inlet screws 102, 104 and downstream mixing screws 106, 108. The inlet screws each include continuous helical double flighting 110, 112 which serves to move material entering the mixer through the inlets 50, 52 toward outlet head 60.

Figure 9:
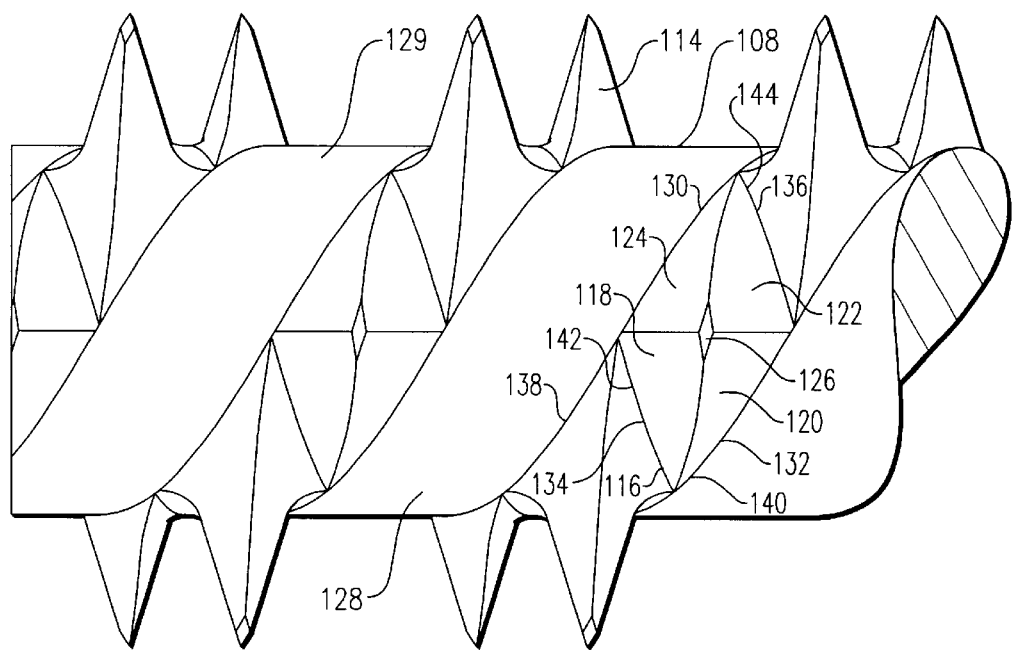
FIG. 9 is a plan view of a mixer screw section, depicting the generally pyramidal mixing elements forming a part of the preferred internal mixing screws of the continuous mixer.
Figure 10:
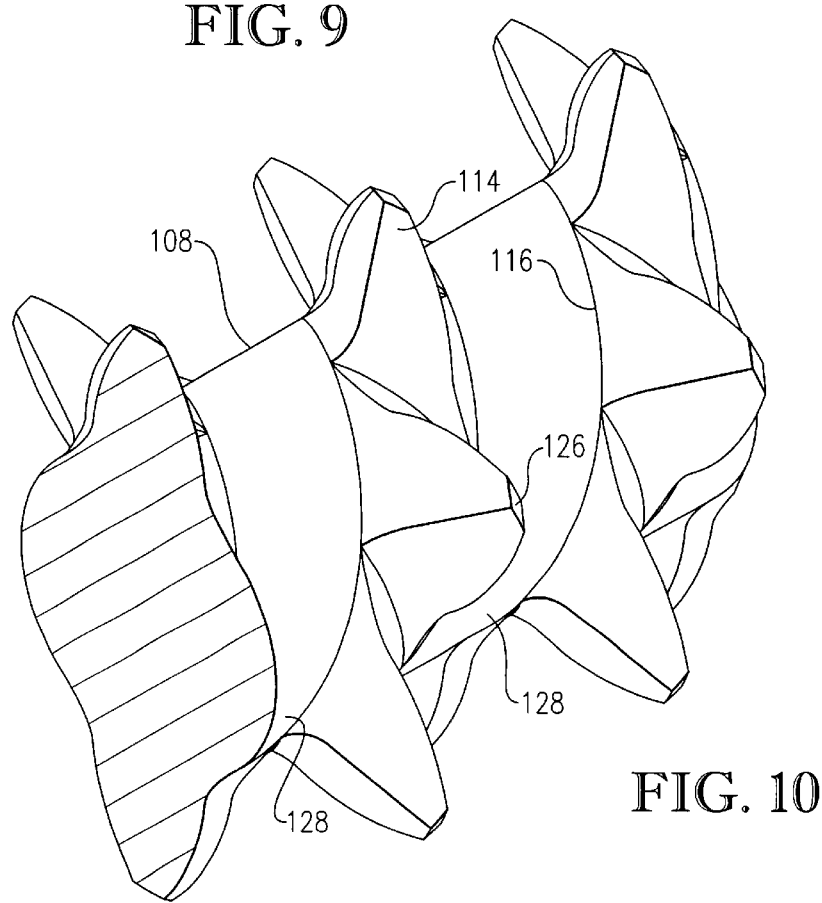
FIG. 10 is an isometric view of the mixing screw section illustrated in FIG. 9.
Figure 11:
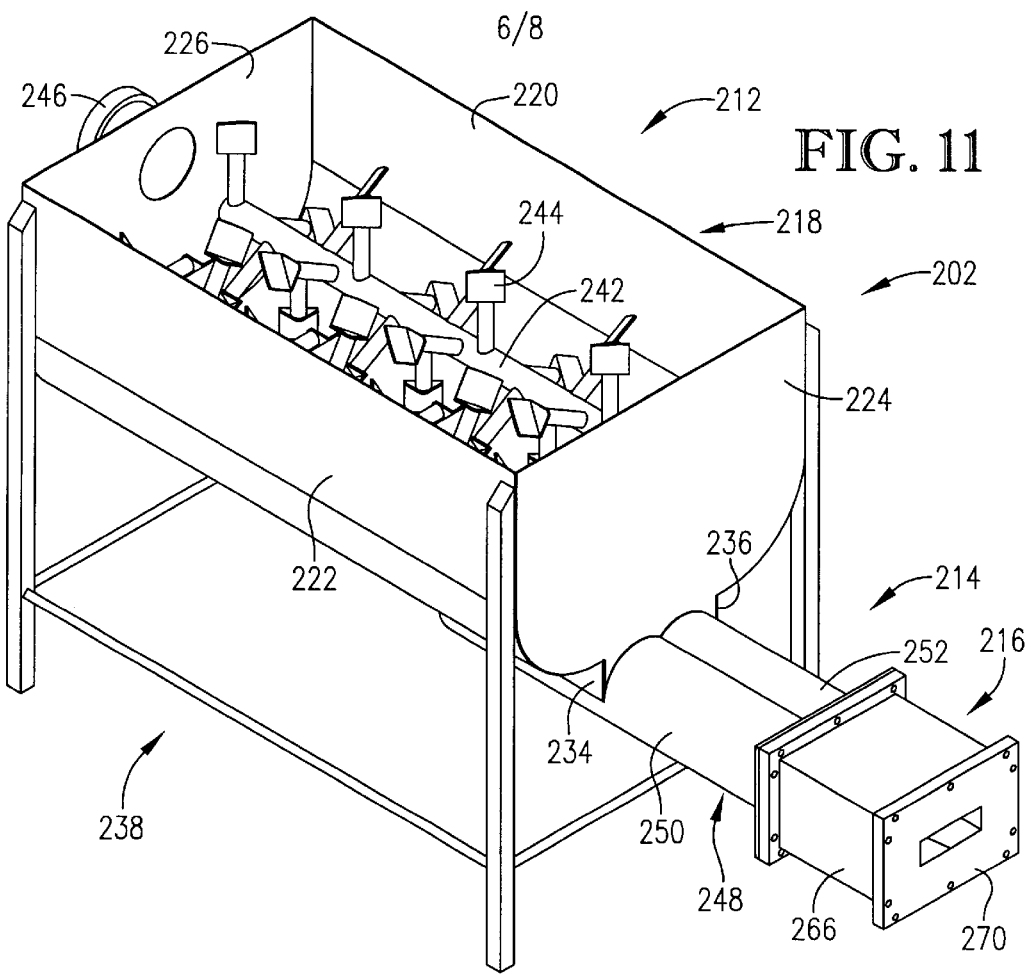
FIG. 11 is an isometric view of a combined preblender and pump apparatus useful in the systems of the invention.

The mixing screws 106, 108 are secured to the shafts 98, 100 and are of specialized configuration to mix the incoming products and produce a uniform output, without creation of undue shear conditions. Attention is directed to FIGS. 9 and 10 which depict in detail the preferred configuration of the mixing screws. Specifically, each of the mixing screws has a series of outwardly projecting, abutting mixing elements 114, each presenting a base 116 and a plurality of converging sidewall surfaces 118, 120, 122, and 124 which terminate in an outer surface 126 having a surface area less than that of the base 116. The elements 114 are oriented in a dual helix pattern along the length of the screw section, leaving corresponding helical base surfaces 128 and 129 between the convolutions of the elements 114.

In more detail, each of the elements 114 is generally pyramidal in shape, with the corresponding base 116 generally diamond-shaped in plan configuration and presenting four arcuate surfaces 118–124 and the apex-like surface 126. Each diamond-shaped base 116 is defined by two pairs of substantially parallel marginal base surfaces, namely long surfaces 130, 132 and short surfaces 134, 136. As best seen in FIG. 9, the long base surfaces 130 of the elements 114 lie along a first helical line 138 whereas the opposed long base surfaces 132 lie along a second helical line 140, with the helical lines 138, 140 being of substantially equal pitch. In addition, the short base surfaces 134 cooperatively define a third helical line 142, with the opposed short base surfaces 136 defining a fourth helical line 144. Again, the helical lines 142, 144 are parallel to each other, and have substantially the same pitch. However, the pitch of the long base surface helical lines 138, 140 is greater than the pitch of the short base surface helical lines 142 and 144. It will also be seen that the outwardly extending surfaces of the elements 114 lie in and cooperatively define respective helical surfaces.

The mixing screws 106, 108 are preferably manufactured by first creating a screw with conventional double helix flighting having the larger pitch referred to previously. Thereafter, this screw is cut to present double helix reverse flighting having the smaller pitch mentioned above. This manufacturing procedure creates the series of mixing elements 114.

In the operation of mixer 32, incoming products are directed through the ports 50, 52 into the interior of the housing 42. At the same time, the screws 44, 46 are rotated so as to move the products towards outlet opening 64. During traversal of the inlet sections 102 and 104, only a minor amount of mixing occurs. However, as the products enter and pass along the length of the mixing screws 106, 108, the product is very intensely mixed so as to yield a final product stream 26 of uniform characteristics. A significant advantage of the mixer 32 is that such product stream mixing is obtained without substantial heating of the products or generation of shear. This effect is achieved by the geometry of the helically arranged mixing elements 114 which serve to not only move the product toward the outlet 64, but also impart a significant amount of flow reversal to the products. Of course, the net movement of the products within the housing is from the inlet ports to the outlet; nevertheless, during such movement there is significant flow reversal so as to obtain the desired homogeneous final product stream.

During the course of mixing, it may be desirable to pass thermal fluid (e.g., cold water or a heating media to inhibit fat buildup) through the passageways 92 and 94 so as to indirectly cool the products. Also, carbon dioxide may be injected through some or all of the ports 88 for this purpose. Process control is facilitated by means of the mounts 90, allowing temperature probes or the like to be mounted along the length of the mixer.

In preferred forms, the system 20 is designed for creating an output stream 26 of predetermined and substantially constant fat/lean ratio, using two individual meat sources M1 and M2 of different fat/lean ratios. Moreover, the system 20 is advantageously configured for computer control. That is, the components of the system 20, including the grind/preblend devices 33, 34, pumps 36, mixer 32 and fat content analyzers 38 and 40 are appropriately connected to a microprocessor (not shown). Additionally, all of the components of the system 20 are usually provided with $CO_2$ injection apparatus so as to maintain, to the extent feasible, the meat being processed under oxygen-free or at least oxygen-minimized conditions.

Figure 2:
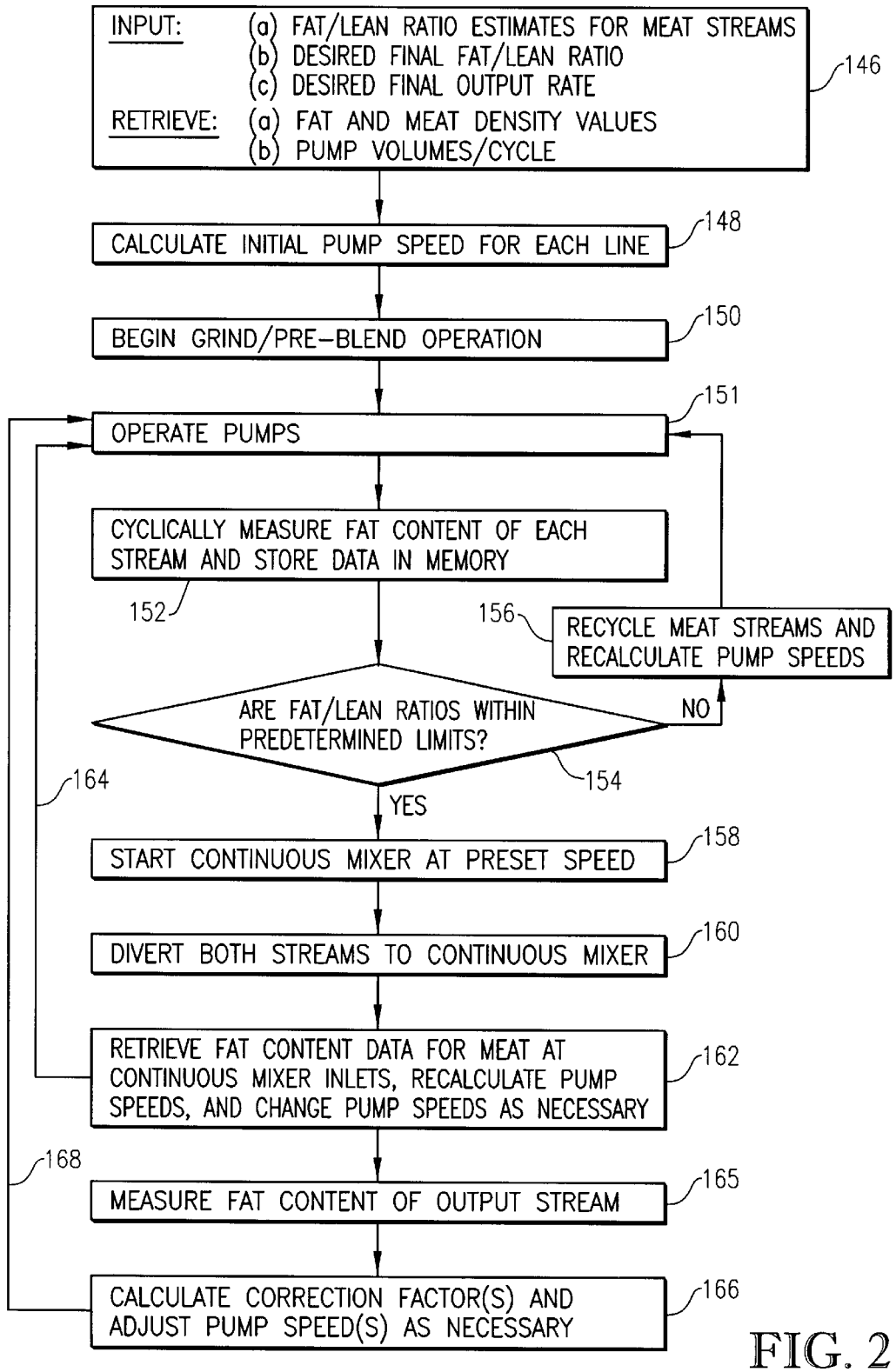
FIG. 2 is a flow diagram of the preferred software algorithm used in the control of the system illustrated in FIG. 1.

FIG. 2 depicts a suitable control program useful in the context of the invention. In particular, in the first steps 146 and 148, an initial speed for the pumps 36 is calculated. This involves inputting into the control program fat/lean ratio estimates for the respective meat streams, the desired fat/lean ratio of the output stream 26, and the desired final output rate. Also, fat and lean meat densities values, as well as pump volumes per cycle of the pumps 36 is retrieved from the computer memory. This information is used step 148 to calculate the initial pump speed for each of the pumps 36.

In the next step 150, the program initiates operation of the grinders and preblenders 33, 34, and also begins the operation of the pumps 36 at the initially calculated speed (step 151). After an appropriate data acquisition delay (e.g., 10 seconds), the fat content in the respective streams is measured in step 152. Such measurements are taken repeatedly, and the measured fat data obtained during each measurement cycle are stored in computer memory.

The program next determines in step 154 whether the fat/lean ratios of the respective streams are within predetermined limits, such as ±2%. If this stability has not been achieved, then the program proceeds to step 156 wherein the valves 39 are diverted to recycle the respective meat streams back to the preblenders 34 via lines 39a, and the process of steps 152–156 is repeated, using the newly calculated pump speeds. Once the stability requirement of step 154 is met, the program proceeds to step 158 where the operation of the mixer 32 is commenced at a preset speed correlated with the desired final output rate. Mixer operation may also involve circulation of a thermal fluid through the ports 96 and the corresponding outlets, and/or injection of coolant or other additives through the injection ports 88. Also, in step 160, both meat streams are diverted to mixer 32 by appropriate operation of the valves 39.

In step 162, the previously measured and stored fat content data for the meat products at and about to enter the continuous mixer inlets is retrieved, and the pump speeds are recalculated; as necessary, these pump speeds are changed in step 164.

As mixed product emerges from mixer outlet 64, the fat content thereof is measured in analyzer 40, as set forth in step 164. This permits a calculation (step 166) of which line 22 or 24 would benefit most from correction of pump speed. That is, it is desirable to operate the pumps 136 as close as possible to the middle of the operating range of the pumps. Accordingly, in step 168, appropriate correction factors are used to adjust the speed of the pumps 36. In this way, stable running conditions can be achieved and maintained throughout the course of a given run. By the same token, if the characteristics of either or both of the meat sources M1 and M2 change, this change can be accommodated within practical limits to maintain consistency in the final product.

Figure 18:
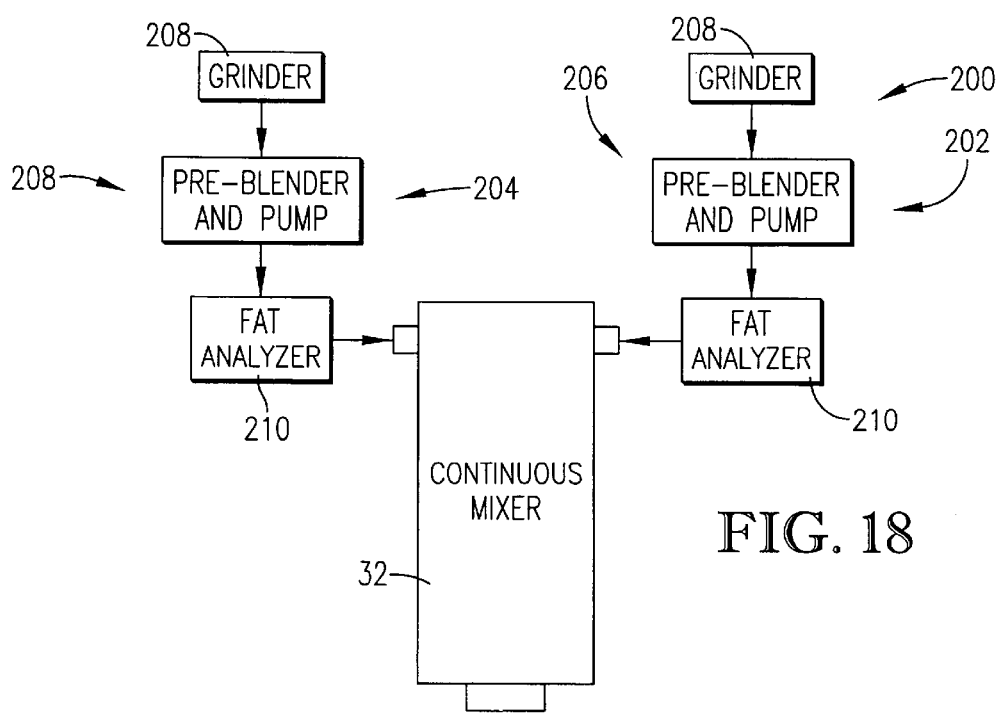
FIG. 18 is a schematic representation of the continuous mixer of the invention, with a pair of the combined preblender and pump devices coupled thereto.

Turning to FIG. 18, a system 200 is schematically illustrated for homogeneously mixing plural incoming product streams of meat or the like to yield a final output stream of desired characteristics. The system 200 is similar in many respects to that illustrated in FIG. 1. However, in this instance, the system is considerably simplified through the use of a pair of combined preblender and pumping devices 202 in lieu of the preblenders 34, pumps 36 and related equipment. In particular, the system 200 again makes use of separate incoming product lines 204, 206 which are designed to handle the divergent incoming product streams. Each line 204, 206 includes, for meat handling operations, a grinder 208 directly coupled to and feeding the devices 202. The output from the latter passes through a fat analyzer 210 and thence into the continuous mixer 32. The system downstream of the mixer 32 is substantially identical to that described with reference to system 20 of FIG. 1.

Broadly speaking, the combined preblender and pump device 202 includes an open top hopper preblend section 212 with a lower, twin-screw feeder-pump unit 214. In the embodiment shown, the unit 214 is equipped with a transition 216 adapted for coupling directly to the input of fat analyzer 210.

The upper preblend section 212 includes an elongated hopper 218 defined by arcuate sidewalls 220, 222, forward end 224 and rear end wall 226. The sidewalls 220, 222 merge to form a bottom wall 228 which extends from rear end wall 226 forwardly, but has, adjacent the forward end thereof, an outlet section 230 made up of vertical end wall 232 and side margins 234, 236. Thus, an outlet opening 237 is defined between the wall 232, margins 234, 236 and front end wall 224. Although not shown, the hopper 218 is provided with a top wall covering the upper end of the hopper in a substantially air tight fashion. As illustrated, the hopper 218 is supported on an upright frame 238 to assume an elevated position.

The hopper 218 is equipped with a pair of elongated, fore and aft extending, axially rotatable mixing shafts 240, 242 which are conventionally powered by a motor (not shown). As best seen in FIG. 13, the shafts 240, 242 are each equipped with a plurality of outwardly extending, elongated, staggered paddle elements 244. The latter are oriented so as to permit free rotation of the shafts 240, 242; however, at the mid-section of the hopper 218, the elements 244 are intercalated. The respective paddle elements 244 are designed to preblend incoming product into the hopper 218, and to move such material forwardly towards and into outlet section 230. The rear end wall 226 is equipped with a tubular product input 246 which is designed to be connected with the output of a grinder 208, again in a substantially air tight manner.

The feeder pump unit 214 includes an elongated housing 248 secured to the underside of hopper 218 and extending forwardly therefrom. The housing 248 has a pair of side-by-side, communicating arcuate sections 250, 252 with an elongated rearward opening therein which mates with and forms a continuation of outlet opening 237. A pair of elongated, axially flights auger screws 254, 256 are located within housing 248 and extend along the length thereof. As best seen in FIG. 16, the screws 254, 256 include rearward mixing sections 258, 260 designed to mix product from hopper 212, as well as forward pumping sections 262, 264. The pumping sections are single flight (although multiple flights could be used) fully intermeshed screw sections designed to create a positive pumping force to propel preblended product towards the outlet of device 202. Preferably, the screws 254, 256 are counterrotating, but co-rotating designs could also be used. The screws 254, 256 are rotated by means of a conventional motor and gear reducer drive (not shown).

The forward end of housing 248 is equipped with a transition 266 which is in the form of a rectangular block having a converging internal passageway 268 and a substantially flat output face 270. The purpose of transition 266 is to direct product pumped via the unit 214 into the inlet of fat analyzer 210, and to also move product through the fat analyzer and into continuous mixer 32.

In the use of the devices 202, meat or other product to be processed is delivered from the grinder 208 through input 246 and directly into hopper 218. If desired, the grinder 208 and the device 202 are pressurized with carbon dioxide in order to minimize oxidation of the product during processing. Once the product enters hopper 218, it is immediately subjected to mixing by rotation of the shafts 240, 242 and the consequent action of paddle elements 244. The product moves forwardly from input 246 and progressively passes into and through opening 237 whereupon the product enters the housing 248. Additional mixing is carried out in the rearward section of the housing 248, at the area of screw sections 258, 260. As the product advances along the length of these mixing screw sections, it next encounters the pumping screw sections 262, 264. Owing to the fully intermeshed construction of the sections 262, 264, the product is forced along the remaining length of the housing 248 and thence into and through transition 266, analyzer 210 and into continuous mixer 32. The mixer 32 operates in the same manner described previously with reference to system 20 in order to generate a final product stream 26 which is fat-analyzed and packaged.

The system 200 using the combined preblender and pump devices 202 can be controlled using software analogous to that described with reference to FIG. 2. Those skilled in the art will appreciate that certain changes would be made in the control software as compared with that shown in FIG. 2, but these are within the skill of the art.

A principal advantage obtained through use of the system 200 is the elimination of separate preblenders and pumps, and the associated connection hardware and control elements. Thus, the system 200 can be more economically produced and operated.

We claim:

1. A combined blending and pumping apparatus comprising:

a hopper having an inlet and presenting a bottom wall having front and rear portions, opposed front and rear wall sections and opposed sidewall sections coupled to said bottom wall, there being an opening through said bottom wall adjacent said front portion thereof, said bottom wall opening providing a hopper outlet spaced from said hopper inlet;

a pair of elongated, axially rotatable shafts located within said hopper and extending along the length thereof between said front and rear wall sections, said shafts being disposed above said bottom wall and said bottom wall opening, each of said shafts having a plurality of outwardly extending mixing elements coupled thereto; and a pumping assembly including an elongated housing presenting an input and an output, said housing input operably coupled with said hopper outlet, and a pair of elongated, axially rotatable, flighted auger screws within said housing and operable to pump said product through and out of said housing, said hopper defining a mixing zone along the length of said bottom wall rear portion which is separate from said housing for initial mixing of an incoming product stream in the mixing zone with subsequent delivery of the mixed incoming product stream to said housing through said bottom wall outlet opening and said housing input.

* * * * *